United States Patent
Morinaga et al.

(10) Patent No.: US 10,650,551 B2
(45) Date of Patent: May 12, 2020

(54) WORK SUPPORT SYSTEM AND WORK METHOD

(71) Applicant: Kabushiki Kaisha Toshiba, Minato-ku (JP)

(72) Inventors: Ryo Morinaga, Yokohama (JP); Sei Musha, Kawasaki (JP); Otoharu Kuwamura, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 176 days.

(21) Appl. No.: 15/802,638

(22) Filed: Nov. 3, 2017

(65) Prior Publication Data

US 2018/0130231 A1 May 10, 2018

(30) Foreign Application Priority Data

Nov. 8, 2016 (JP) .................................. 2016-218249

(51) Int. Cl.
*G06T 19/00* (2011.01)
*G06T 17/20* (2006.01)
(Continued)

(52) U.S. Cl.
CPC .............. *G06T 7/74* (2017.01); *G06T 1/0007* (2013.01); *G06T 7/254* (2017.01); *G06T 17/20* (2013.01);
(Continued)

(58) Field of Classification Search
CPC .... G06T 7/74; G06T 7/75; G06T 7/70; G06T 7/73; G06T 7/254; G06T 7/251;
(Continued)

(56) References Cited

U.S. PATENT DOCUMENTS

| | | | | |
|---|---|---|---|---|
| 2006/0221417 A1* | 10/2006 | Fujieda | ................ | G06K 9/2072 358/538 |
| 2007/0184422 A1* | 8/2007 | Takahashi | .............. | G06Q 50/20 434/262 |
| 2007/0217683 A1* | 9/2007 | Kinoshita | .......... | G06K 9/00214 382/190 |

FOREIGN PATENT DOCUMENTS

| | | |
|---|---|---|
| JP | 2002-007485 A | 1/2002 |
| JP | 2005-331383 A | 12/2005 |

(Continued)

*Primary Examiner* — Dwayne D Bost
*Assistant Examiner* — Stephen M Brinich
(74) *Attorney, Agent, or Firm* — Oblon, McClelland, Maier & Neustadt, L.L.P.

(57) ABSTRACT

According to one embodiment, a work support system includes an imager, a storage part, and a processor. The imager is configured to image a first transfer object after the first transfer object is transferred into a structural object and arranged inside the structural object. The storage part stores first three-dimensional data. The first three-dimensional data includes three-dimensional data of the structural object and three-dimensional data of the first transfer object. The three-dimensional data of the first transfer object is overlaid at a first position inside the structural object of the three-dimensional data. The processor detects a displacement of the first transfer object of second three-dimensional data with respect to the first transfer object of the first three-dimensional data. The second three-dimensional data is obtained by imaging the first transfer object arranged inside the structural object.

9 Claims, 6 Drawing Sheets

(51) Int. Cl.
  *G06T 7/73* (2017.01)
  *G06T 7/254* (2017.01)
  *G06T 1/00* (2006.01)

(52) U.S. Cl.
  CPC .......... *G06T 19/00* (2013.01); *G06T 2200/04* (2013.01); *G06T 2200/08* (2013.01); *G06T 2207/10008* (2013.01); *G06T 2207/30164* (2013.01)

(58) Field of Classification Search
  CPC ..... G06T 7/246; G06T 1/0007; G06T 1/0014; G06T 17/00; G06T 17/10
  USPC ................................ 382/151–154, 141, 143
  See application file for complete search history.

(56) References Cited

FOREIGN PATENT DOCUMENTS

| | | |
|---|---|---|
| JP | 2007-11617 | 1/2007 |
| JP | 2014-178794 | 9/2014 |
| JP | 5951075 | 7/2016 |

\* cited by examiner

WORK SUPPORT SYSTEM AND WORK METHOD

CROSS-REFERENCE TO RELATED APPLICATIONS

This application is based upon and claims the benefit of priority from Japanese Patent Application No. 2016-218249, filed on Nov. 8, 2016; the entire contents of which are incorporated herein by reference.

FIELD

Embodiments described herein relate generally to a work support system and a work method.

BACKGROUND

In JP-A 2014-178794 (Kokai), a system is discussed in which a laser scanner or the like is used to acquire three-dimensional data of a structural object, and a transfer path is generated for transferring building materials and/or equipment into the interior of the structural object. According to the technology discussed in JP-A 2014-178794 (Kokai), the efficiency of the work for the transferring can be increased.

However, in JP-A 2014-178794 (Kokai), the fixation work of the transferred building materials and/or equipment is not described; and there is still room for improvement for the work efficiency of such fixation work.

DETAILED DESCRIPTION

According to one embodiment, a work support system includes an imager, a storage part, and a processor. The imager is configured to image a first transfer object after the first transfer object is transferred into a structural object and arranged inside the structural object. The storage part stores first three-dimensional data. The first three-dimensional data includes three-dimensional data of the structural object and three-dimensional data of the first transfer object. The three-dimensional data of the first transfer object is overlaid at a first position inside the structural object of the three-dimensional data. The processor detects a displacement of the first transfer object of second three-dimensional data with respect to the first transfer object of the first three-dimensional data. The second three-dimensional data is obtained by imaging the first transfer object arranged inside the structural object.

Embodiments of the invention will now be described with reference to the drawings.

In the drawings and the specification of the application, components similar to those described thereinabove are marked with like reference numerals, and a detailed description is omitted as appropriate.

Figure 1:
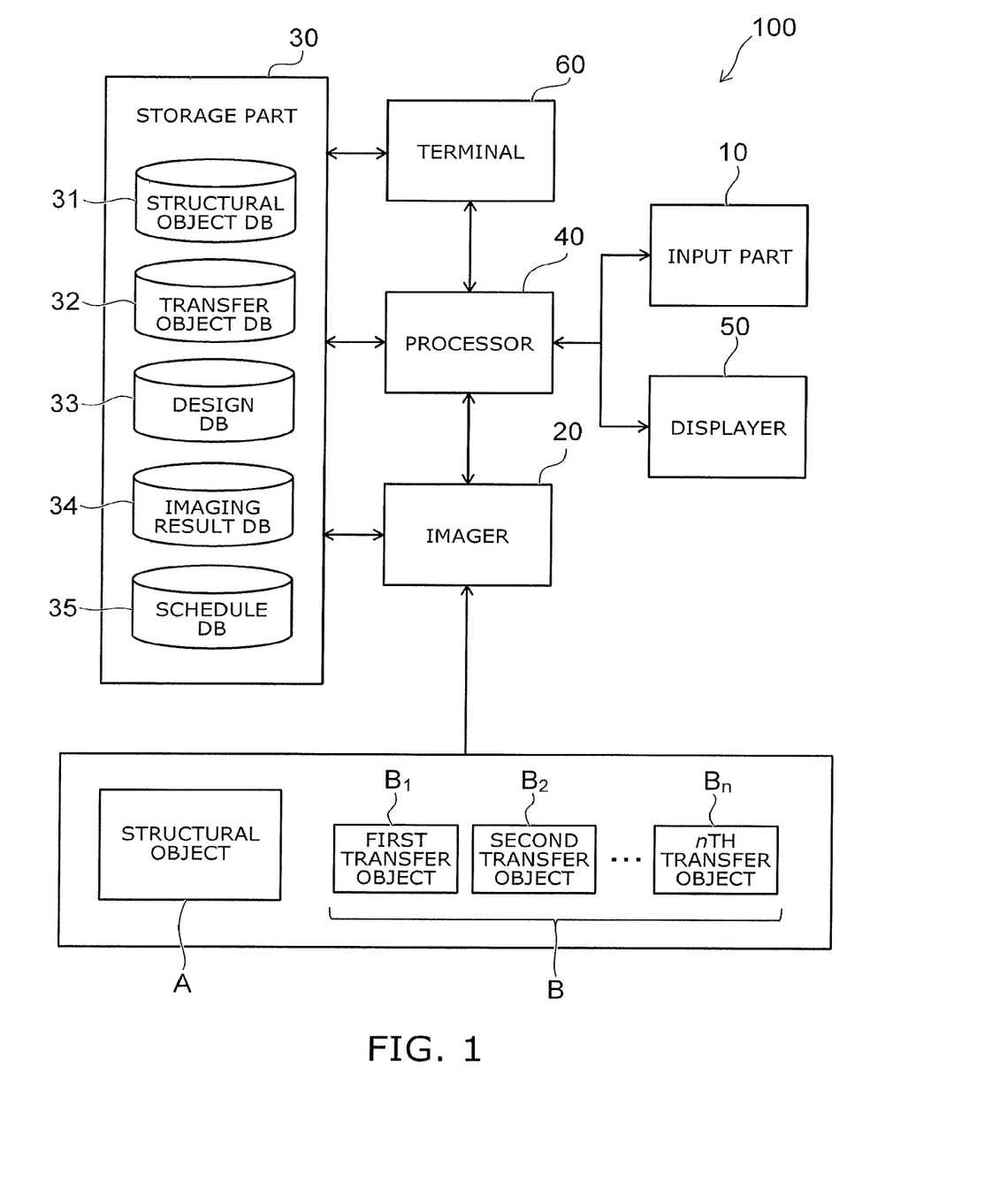
FIG. 1 is a block diagram illustrating a configuration of a work support system according to an embodiment.

FIG. 1 is a block diagram illustrating the configuration of the work support system 100 according to the embodiment.

As illustrated in FIG. 1, the work support system 100 includes an input part 10, an imager 20, a storage part 30, a processor 40, a displayer 50, and a terminal 60.

For example, the work support system 100 according to the embodiment is used to support work. The work includes, for example, the transfer of multiple transfer objects B into a structural object A, the connection of the multiple transfer objects B, and the fixation of the multiple transfer objects B. The multiple transfer objects B include first to nth transfer objects $B_1$ to $B_n$.

For example, first work and second work described below are examples of such work.

In the first work, multiple equipment for configuring a paper sheet sorting apparatus are transferred into an existing structural object. The multiple equipment are installed and assembled.

In the second work, multiple building materials such as pipes, etc., are transferred into the structural object at the construction site of the plant. The multiple building materials are linked to each other while being fixed by welding, etc.

The input part 10 performs the input of information to the processor 40. For example, the input part 10 is used by a user of the work support system 100. The input part 10 is, for example, a keyboard, a touch panel, a microphone (voice input), etc.

The imager 20 acquires three-dimensional data of a subject that is imaged. The imager 20 is, for example, a three-dimensional laser scanner. The imager 20 scans a laser over the surface of the subject and determines the three-dimensional coordinates of the irradiation points from the reflected light. The exterior form of the subject is acquired as a collection of many points (point cloud data). For example, the imager 20 is mounted at the work site inside the structural object A. The imager 20 automatically acquires the point cloud data of the internal structure of the structural object A and the point cloud data of the first to nth transfer objects $B_1$ to $B_n$.

Multiple imagers 20 may be mounted inside the structural object A. The multiple imagers 20 reduce dead angles by being mounted at mutually-different positions. The point cloud data that represents the exterior forms of the objects is acquired more accurately. In the case where the multiple imagers 20 are mounted inside the structural object A, the processor 40 compares the multiple point cloud data and overlays the parts that match each other. Thereby, one set of point cloud data is generated.

The storage part 30 stores the various data used in the work support system 100. The storage part 30 is, for example, a hard disk drive (HDD) built into a PC, a file server, etc.

The storage part 30 includes a structural object database 31, a transfer object database 32, a design database 33, an imaging result database 34, and a schedule database 35.

The structural object database 31 stores the three-dimensional data of the internal structure of the structural object A where the work is performed. The three-dimensional data includes the area inside the structural object A where the first to nth transfer objects $B_1$ to $B_n$ are fixed, and the transfer path to the area of the first to nth transfer objects $B_1$ to $B_n$ inside the structural object A. The structural object database 31 may further store three-dimensional data of a location where the transfer of the first to nth transfer objects $B_1$ to $B_n$ is performed outside the structural object A. For example, such three-dimensional data is obtained by using the imager 20 to image the structural object A prior to the work and by acquiring the point cloud data. Or, in the case where three-dimensional CAD data of the structural object A and the location where the transfer is performed exists, such three-dimensional CAD data may be stored in the structural object database 31.

The transfer object database 32 stores the three-dimensional data (e.g., the three-dimensional CAD data) of each of the first to nth transfer objects $B_1$ to $B_n$. In the case where there is no three-dimensional CAD data of these transfer objects, the three-dimensional data may be acquired by using the imager 20 to image each of the transfer objects prior to the work.

The design database 33 stores first three-dimensional data. In the first three-dimensional data, the three-dimensional data of the structural object A that is stored in the structural object database 31 and the three-dimensional data of each of the transfer objects that is stored in the transfer object database 32 are overlaid in three-dimensional coordinates.

The imaging result database 34 stores second three-dimensional data in the state in which the first to nth transfer objects $B_1$ to $B_n$ are actually arranged inside the structural object A. The second three-dimensional data is obtained by using the imager 20 to image the first to nth transfer objects $B_1$ to $B_n$ after the first to nth transfer objects $B_1$ to $B_n$ are arranged and fixed inside the structural object A.

The imaging result database 34 may store other multiple three-dimensional data. The other multiple three-dimensional data respectively illustrates states in which the first to nth transfer objects $B_1$ to $B_n$ are fixed. For example, the imaging result database 34 may store three-dimensional data illustrating a state after the first transfer object $B_1$ is fixed before the second transfer object $B_2$ is transferred, three-dimensional data illustrating a state after the first transfer object $B_1$ and the second transfer object $B_2$ are fixed before the third transfer object $B_3$ is transferred, etc.

The schedule database 35 stores the schedule of the work. For example, the work schedule is generated by a generally-used scheduler. The work schedule includes information such as the delivery time of the work, the transfer sequence and the fixation sequence of the transfer objects, the transfer date and time of each of the transfer objects, the resources (the personnel, the machines, etc.) used in the transfer, the operation time period of each resource, etc.

The processor 40 is, for example, a CPU (a central processing unit) and memory included in a PC. A program for causing the processor 40 to execute the various processing is stored in the memory. The processor 40 executes the processing while referring to the data stored in the storage part 30. The specific processing that is executed by the processor 40 is described below.

The displayer 50 is, for example, a monitor, a touch panel, etc. The displayer 50 displays each database stored in the storage part 30 so that the user of the work support system 100 can confirm and edit each database. The displayer 50 displays the results derived by the processor 40 so that the user can confirm the results.

The terminal 60 is, for example, a mobile device such as a smartphone, a tablet, etc. The worker that works inside the structural object A carries the terminal 60. The processor 40 can transmit the derived results to the terminal 60. In other words, the terminal 60 functions as a receiver that receives the information transmitted from the processor 40. The worker can refer to each database of the storage part 30 by using the terminal 60.

The components described above are connected to each other by a wireless network, various cables such as USB cables, LAN cables, etc., so that the necessary information can be mutually sent and received.

An example of the work and operations of the work support system 100 according to the embodiment will now be described with reference to FIG. 2 and FIGS. 3A to 3D.

Figure 2:
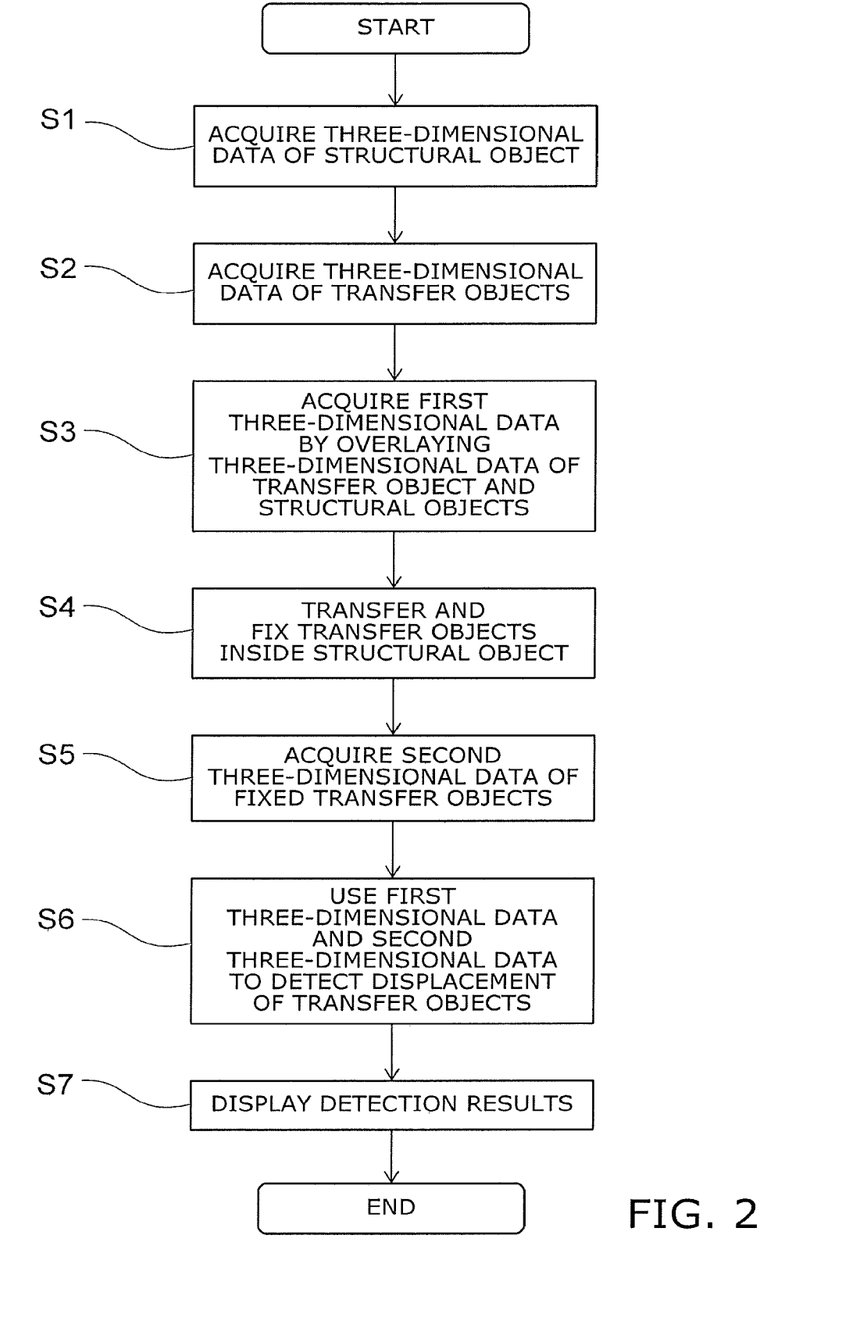
FIG. 2 is a flowchart illustrating an example of work and operations of the work support system according to the embodiment.

FIG. 2 is a flowchart illustrating an example of the work and the operations of the work support system 100 according to the embodiment.

FIGS. 3A to 3D are schematic views illustrating an example of the data stored in the storage part 30.

Figure 3A:
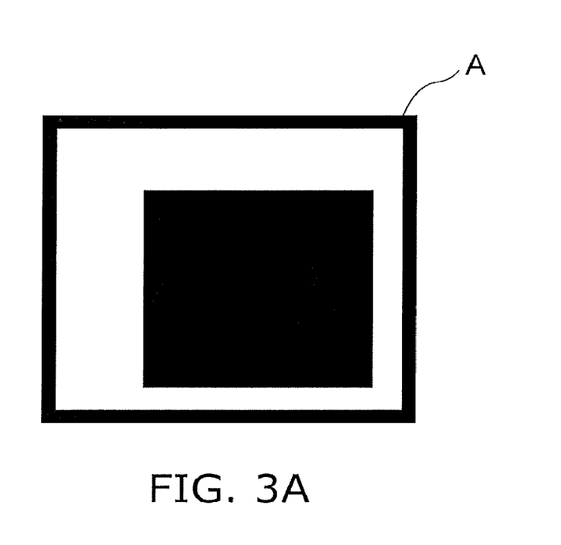
FIGS. 3A to 3D are schematic views illustrating an example of data stored in a storage part.
Figure 3B:
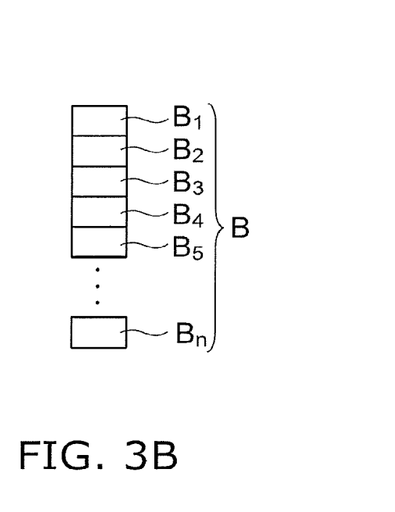
Figure 3C:
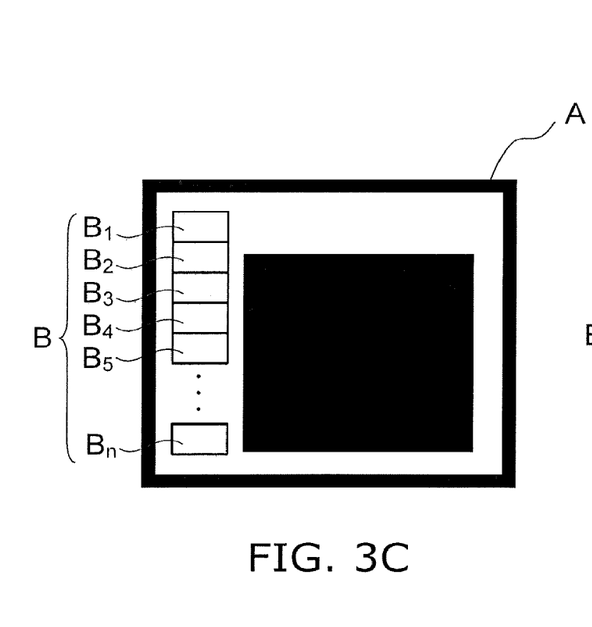
Figure 3D:
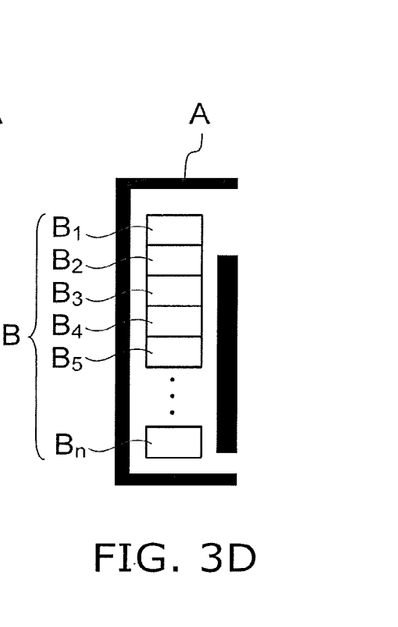

FIG. 3A illustrates the three-dimensional data of the structural object A stored in the structural object database 31. FIG. 3B illustrates the three-dimensional data of the first to nth transfer objects $B_1$ to $B_n$ connected to each other. The three-dimensional data illustrated in FIG. 3B is stored in the transfer object database 32. FIG. 3C illustrates the first three-dimensional data stored in the design database 33. FIG. 3D illustrates the second three-dimensional data stored in the imaging result database 34.

The three-dimensional data that is stored in the storage part 30 is illustrated schematically in two dimensions in FIG. 3A to FIG. 3D.

The flow illustrated in FIG. 2 mainly includes step S4 in which the transfer and fixation of the transfer objects are performed, steps S1 to S3 that are performed prior to the work of step S4, and steps S5 to S7 that are performed by the work support system 100 after the work of steps S1 to S4.

Step S1

Point cloud data is generated by imaging the interior of the structural object A by using the imager 20. Thereby, the three-dimensional data of the internal structure of the structural object A is acquired. In the case where three-dimensional CAD data or the like of the structural object A already exists, the three-dimensional CAD data may be utilized; and step S1 may be omitted.

By step S1, the three-dimensional data of the internal structure of the structural object A is prepared as illustrated in FIG. 3A.

Step S2

The three-dimensional data of the first to nth transfer objects $B_1$ to Bn is acquired. In the case where three-dimensional CAD data or the like of the first to nth transfer objects $B_1$ to Bn exists, such data may be utilized; and step S2 may be omitted. In the case where there is no three-dimensional CAD data or the like, for example, point cloud data that reflects the exterior forms of these transfer objects is generated by using a laser scanner to image each of the first to nth transfer objects $B_1$ to $B_n$. Thereby, the three-dimensional data of the first to nth transfer objects $B_1$ to $B_n$ is acquired.

By step S2, the three-dimensional data of the first to nth transfer objects $B_1$ to $B_n$ is prepared as illustrated in FIG. 3B.

Step S3

The three-dimensional data of the first to nth transfer objects $B_1$ to $B_n$ prepared in step S2 is overlaid in three-dimensional coordinates on the three-dimensional data of the structural object A prepared in step S1. The three-dimensional data of the first to nth transfer objects $B_1$ to $B_n$ is overlaid at a first position of the structural object A of the three-dimensional data. The first position corresponds to a second position where each of the transfer objects are fixed inside the structural object A in the actual work.

The first three-dimensional data is generated by step S3. In the first three-dimensional data, the three-dimensional data of the first to nth transfer objects $B_1$ to $B_n$ is arranged at the first position inside the structural object A of the three-dimensional data as illustrated in FIG. 3C.

After generating the first three-dimensional data, the user may use the first three-dimensional data to investigate and generate the transfer paths when transferring each of the transfer objects to the fixation locations inside the structural object A. For example, the user performs the investigation and the generation of the transfer paths while moving each of the first to nth transfer objects $B_1$ to $B_n$ inside the structural object A in the first three-dimensional data. By using the first three-dimensional data, the transfer paths can be investigated while checking for the existence of interference between the structural object A and each of the transfer objects when transferring.

Or, the work support system 100 may be configured so that the processor 40 executes the following operations. For example, the processor 40 automatically derives the transfer path of each of the transfer objects based on information such as the fixation locations and the coordinates of the first to nth transfer objects $B_1$ to $B_n$, the coordinates of the transfer entrance of the structural object A, etc. At this time, the processor 40 may refer to the schedule database 35. The processor 40 may derive the transfer path of each of the transfer objects while considering the transfer sequence of the first to nth transfer objects $B_1$ to $B_n$.

The processor 40 may cause the displayer 50 to display a video image of each of the first to nth transfer objects $B_1$ to $B_n$ moving along the transfer paths set in the three-dimensional data of the structural object A. Using the first three-dimensional data, the processor 40 may cause the displayer 50 to display a state in which the first to nth transfer objects $B_1$ to $B_n$ are arranged at the first position inside the structural object A.

By causing the displayer 50 to display such information, the states when transferring and after transferring can be ascertained in specific detail prior to actually transferring the first to nth transfer objects $B_1$ to $B_n$. It is possible to perform the work more smoothly. Such information may be presented at the delivery locations of the transfer objects prior to the work. The appearance of the work and the state after the delivery can be shared with the customer in more specific detail.

In the case where the point cloud data of the internal structure of the structural object A is acquired in step S1, the point cloud data may include information relating to the detailed state of the floor surface inside the structural object A. In such a case, the worker can confirm the detailed state of the floor surface inside the structural object A from the three-dimensional data stored in the structural object database 31. At this time, the worker may perform the following work in the first three-dimensional data. The worker may modify the fixation position of the first to nth transfer objects $B_1$ to $B_n$ to avoid parts of the floor surface where the unevenness is large. The worker may adjust the height of members interposed between the floor surface and each of the transfer objects to reduce the tilt with respect to the horizontal direction of each of the transfer objects.

Step S4

The first to nth transfer objects $B_1$ to $B_n$ are actually transferred into the structural object A and fixed. At this time, the first to nth transfer objects $B_1$ to $B_n$ are fixed at the predetermined first position inside the structural object A. In other words, the first to nth transfer objects $B_1$ to $B_n$ are fixed so that the position after the fixation of the first to nth transfer objects $B_1$ to $B_n$ matches the position where the first to nth transfer objects $B_1$ to $B_n$ are arranged in the first three-dimensional data.

Step S5

The first to nth transfer objects $B_1$ to $B_n$ that are fixed are imaged by the imager 20.

By step S5, the three-dimensional data (the second three-dimensional data) of the first to nth transfer objects $B_1$ to $B_n$ actually fixed inside the structural object A is acquired as illustrated in FIG. 3D. The second three-dimensional data is stored in the storage part 30.

In the example illustrated in FIG. 3D, only the three-dimensional data of the first to nth transfer objects $B_1$ to $B_n$ and the periphery of the first to nth transfer objects $B_1$ to $B_n$ is acquired. In step S5, the three-dimensional data of the first to nth transfer objects $B_1$ to $B_n$ and the entire interior of the structural object A may be acquired as in FIG. 3C.

Step S6

The processor 40 compares the first three-dimensional data obtained in step S3 and the second three-dimensional data obtained in step S5. Thereby, the displacement of the first to nth transfer objects $B_1$ to $B_n$ of the second three-dimensional data with respect to the first to nth transfer objects $B_1$ to $B_n$ of the first three-dimensional data is detected.

More specifically, the processor 40 overlays the first three-dimensional data and the second three-dimensional data in the same three-dimensional coordinate system. Thereby, how much the position of the first to nth transfer objects $B_1$ to $B_n$ is displaced between the first three-dimensional data and the second three-dimensional data is detected. In other words, the processor 40 detects, for the first to nth transfer objects $B_1$ to $B_n$, the degree of the difference of the position when actually fixed with respect to the position designed prior to the transfer.

Step S7

The processor 40 causes the displayer 50 to display the detection results. The processor 40 transmits the detection results toward the terminal 60. The terminal 60 displays the received results on a screen. The worker confirms the detection results displayed by the terminal 60. Thereby, the worker can easily confirm whether or not the position of the fixed first to nth transfer objects $B_1$ to $B_n$ matches the position designed beforehand.

By steps S5 to S7 described above being performed by the work support system 100 according to the embodiment, it can be detected automatically whether or not the position of the first to nth transfer objects $B_1$ to $B_n$ after the fixation matches the position designed beforehand.

Therefore, according to the work support system 100 according to the embodiment, it is unnecessary for the worker to measure and confirm the position of the first to nth transfer objects $B_1$ to $B_n$ after the fixation; and the work efficiency can be increased.

By using the work support system 100 according to the embodiment, detection results that do not depend on the surveying skill of the worker are obtained. Therefore, the existence and degree of the displacement can be verified with higher precision. For example, by detecting the displacement with high precision, the worker can refix each of the transfer objects based on the detection results. Therefore, the displacement of the final fixation position of each of the transfer objects with respect to the design position can be small; and the quality of the work can be improved.

One more specific example of the detection of the displacement and the display of the detection results of steps S6 and S7 will now be described with reference to FIG. 4 to FIGS. 6A to 6C.

Figure 4:
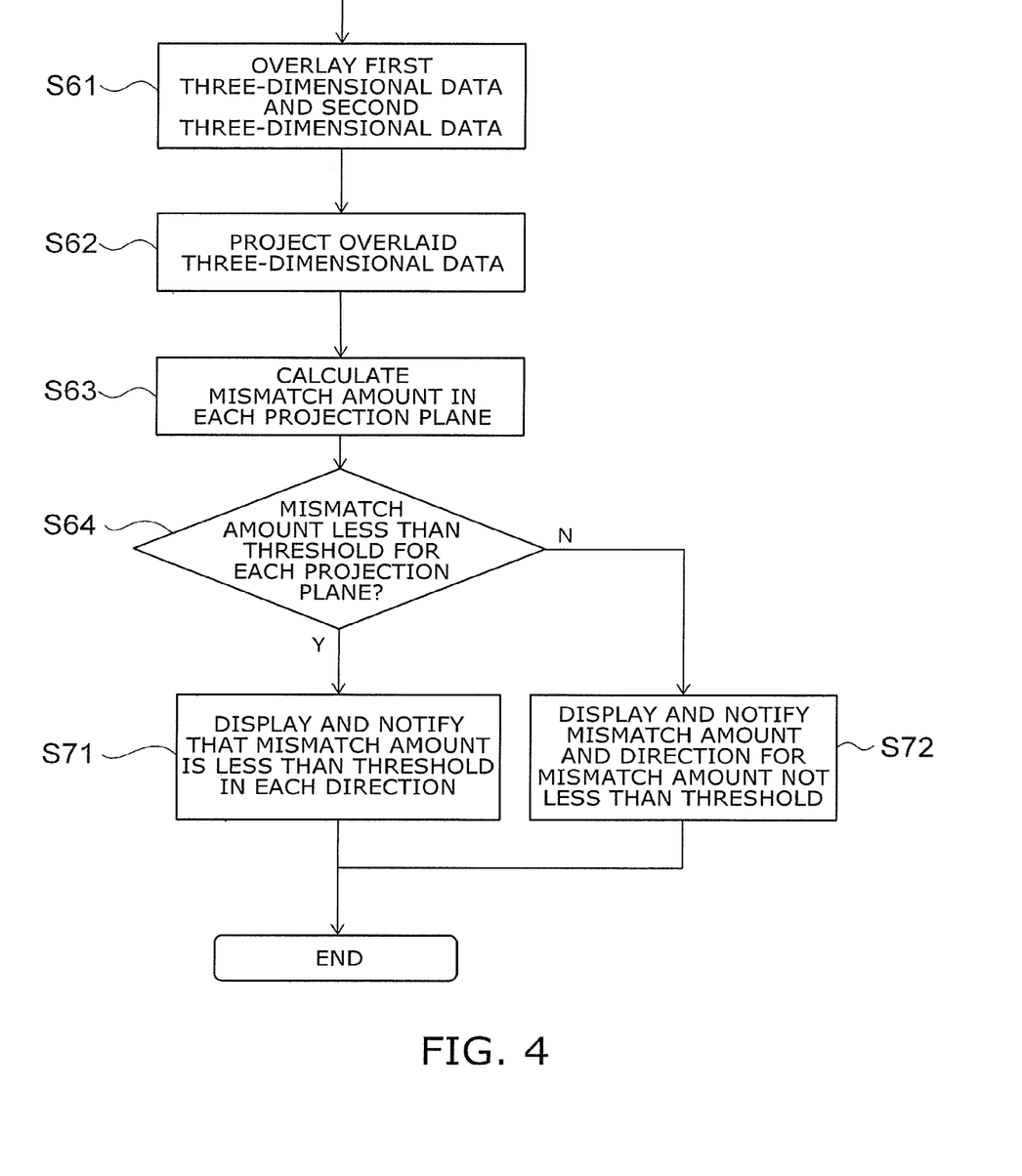
FIG. 4 is a flowchart illustrating an example of specific processing of steps S6 and S7 illustrated in FIG. 2.

FIG. 4 is a flowchart illustrating an example of the specific processing of steps S6 and S7 illustrated in FIG. 2.

Figure 5:
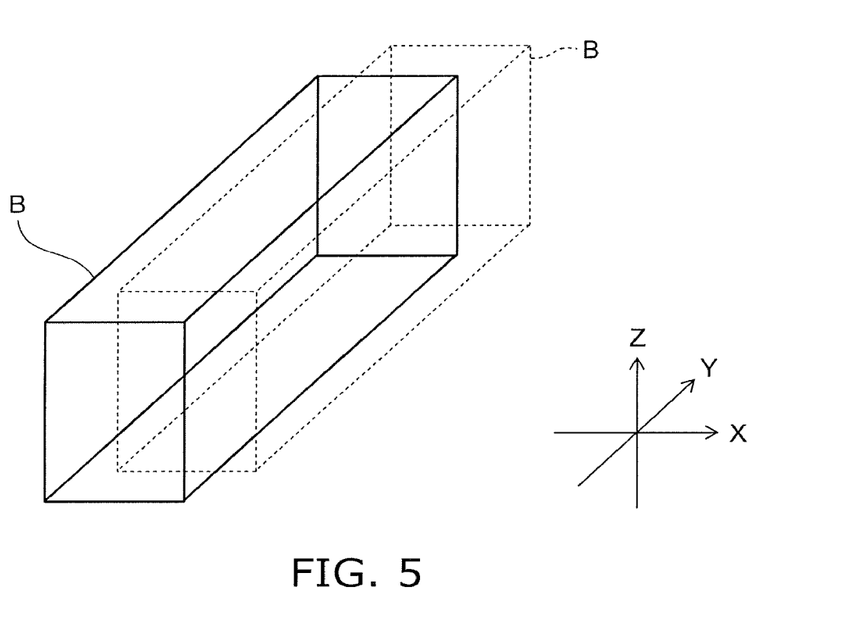
FIG. 5 is a schematic view illustrating an example when first three-dimensional data and second three-dimensional data are overlaid.

FIG. 5 is a schematic view illustrating an example when the first three-dimensional data and the second three-dimensional data are overlaid.

Figure 6A:
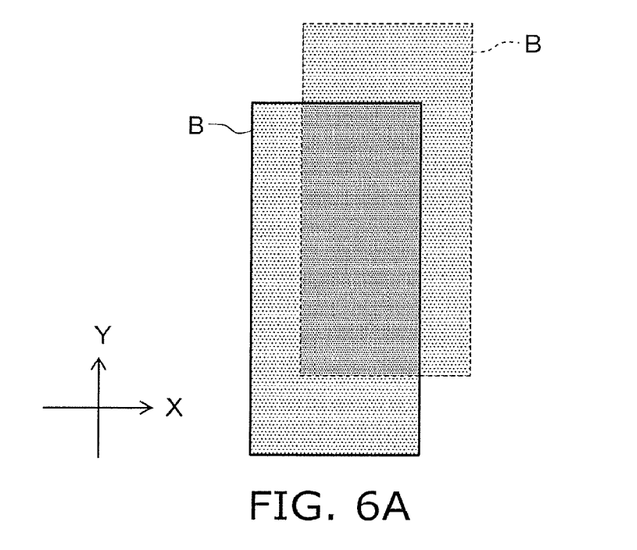
FIGS. 6A to 6C are schematic views illustrating the appearance when the three-dimensional data of FIG. 5 is projected onto each plane.
Figure 6B:
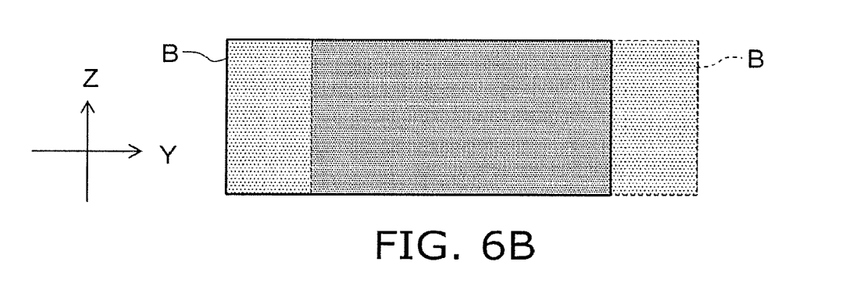
Figure 6C:
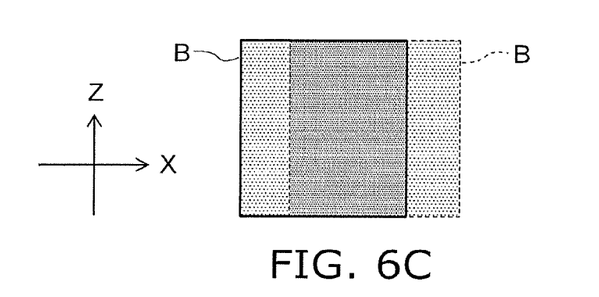

FIGS. 6A to 6C are schematic views illustrating the appearance when the three-dimensional data of FIG. 5 is projected onto each plane.

In the example illustrated in FIG. 4, steps S61 to S64 are performed in step S6; and step S71 or S72 is performed in step S7.

Step S61

Similarly to step S6 described above, the first three-dimensional data and the second three-dimensional data are overlaid in the same three-dimensional coordinate system in step S61.

FIG. 5 illustrates the schematic appearance when overlaid. In FIG. 5, the transfer object B that is included in the first three-dimensional data is illustrated by the broken lines; and the transfer object B that is included in the second three-dimensional data is illustrated by the solid lines. At least the second three-dimensional data is point cloud data; but FIG. 5 schematically illustrates the outer edges of the point cloud data using straight lines.

Step S62

The transfer object B of the first three-dimensional data and the transfer object B of the second three-dimensional data after the overlaying are projected in some direction. Here, the case of being projected onto planes (the X-Y plane, the Y-Z plane, and the X-Z plane) perpendicular to the directions in the three-dimensional coordinates (the X-direction, the Y-direction, and the Z-direction) is described.

The appearance when the three-dimensional data illustrated in FIG. 5 is projected onto each plane is illustrated in FIGS. 6A to 6C.

FIG. 6A illustrates the projection of the X-Y plane. FIG. 6B illustrates the projection of the Y-Z plane. FIG. 6C illustrates the projection of the X-Z plane.

In FIG. 6A to FIG. 6C, the transfer object B of the first three-dimensional data is illustrated by the broken lines; and the transfer object B of the second three-dimensional data is illustrated by the solid lines. The part where the density of the dots is high illustrates the part where the transfer objects B overlap (match) between the first three-dimensional data and the second three-dimensional data. The parts where the density of the dots is low illustrate the parts where the transfer objects B do not overlap (do not match) between the first three-dimensional data and the second three-dimensional data.

Step S63

The processor 40 calculates the mismatch amount of the three-dimensional data of the transfer objects B between the first three-dimensional data and the second three-dimensional data for each of the projection planes as illustrated in FIG. 6A to FIG. 6C.

The first three-dimensional data includes, for example, the three-dimensional CAD data of the transfer object B. In such a case, the proportion of the three-dimensional CAD data and the point cloud data overlapping in the projection plane is calculated. At this time, the region separated from any point included in the point cloud data by a prescribed distance or more in the three-dimensional CAD data is determined to be mismatched. Or, points that do not overlap the three-dimensional CAD data are determined to be mismatched.

As an example, the irradiation angle pitch of the laser beam irradiated from the imager 20 has a spacing of 3 millimeters at 10 meters when the point cloud data is generated by the imager 20. In such a case, the prescribed distance is set to 10 millimeters.

The processor 40 detects a first mismatch amount in the X-direction (the first direction), a second mismatch amount in the Y-direction (the second direction), and a third mismatch amount in the Z-direction (the third direction) for the transfer object B. For example, the processor 40 calculates the number of points determined to be mismatched as the first mismatch amount, the second mismatch amount, and the third mismatch amount respectively for the multiple projection planes. Or, the processor 40 may calculate the surface area of the three-dimensional CAD data determined to be mismatched as the first mismatch amount, the second mismatch amount, and the third mismatch amount respectively for the multiple projection planes.

Or, the processor 40 may calculate the proportion of the number of points determined to be mismatched with respect to the number of points included in the point cloud data of the transfer object B as the first mismatch amount, the second mismatch amount, and the third mismatch amount respectively for the multiple projection planes. Or, the processor 40 may calculate the proportion of the surface area determined to be mismatched with respect to the surface area of the three-dimensional CAD data as the first mismatch amount, the second mismatch amount, and the third mismatch amount respectively for the multiple projection planes.

The first three-dimensional data and the second three-dimensional data may include information of the colors of each of the transfer objects B. In such a case, the match or the mismatch may be determined further based on the information of the color of each point.

Or, the processor 40 may extract characteristic parts from each of the transfer objects B of the first three-dimensional data and the second three-dimensional data for each projection plane. In such a case, the processor 40 may calculate the distances between the characteristic parts as the first mismatch amount, the second mismatch amount, and the third mismatch amount respectively for the multiple projection planes.

Thus, the processor 40 calculates the mismatch amount for each mutually-orthogonal direction (each projection plane). Thereby, it can be detected how much and in which direction the fixed transfer object B is displaced with respect to the pre-designed position.

Or, the mismatch amount also can be calculated for any projection plane by projecting the overlaid first three-dimensional data and second three-dimensional data in any direction.

In the example described above, the proportion or the number of the points or the surface area determined to be mismatched is calculated as the mismatch amount. The proportion or the number of the points or the surface area determined to match may be calculated as the mismatch amount. Even in such a case, it can be considered that substantially the mismatch amount is calculated.

After calculating the mismatch amount described above in step S63, the processor 40 may execute the following method.

The processor 40 moves and rotates the transfer object B of one of the first three-dimensional data or the second three-dimensional data for each projection plane. At this time, the processor 40 moves the transfer object B so that the mismatch amount of the transfer object B between the first three-dimensional data and the second three-dimensional data is a minimum. The processor 40 stores, in the storage part 30, the result of the calculated movement distance and rotation angle in each direction.

According to this method, the movement direction, the movement distance, and the rotation angle of the transfer object B necessary to minimize the mismatch amount for each projection plane are calculated. This method is effective for work in which the multiple transfer objects are sequentially transferred and fixed. In such work, if the fixation position of one transfer object is rotated with respect to the predetermined position, the amount of the displacement (the shift of the position) for the other transfer objects fixed to the one transfer object increases according to the number of transfer objects to be fixed. Accordingly, in the case where the work support system 100 is used in such work, it is desirable for the processor 40 to calculate the rotation angle for minimizing the mismatch amount.

Step S64

A preset threshold for the mismatch amount detected in step S63 is stored in the storage part 30. The processor 40 compares the mismatch amount to the threshold for each projection plane. For example, the mismatch amount that can be tolerated in each direction is set as the threshold.

In the case where the mismatch amount is less than the threshold for each projection plane, the flow proceeds to step S71.

In the case where a mismatch amount that is not less than the threshold exists for any of the projection planes, the flow proceeds to step S72.

Step S71

The processor 40 causes the displayer 50 to display or notifies the terminal 60 that the mismatch amount in each direction is less than the threshold and within the tolerance range for the fixed first to nth transfer objects $B_1$ to $B_n$. At this time, the mismatch amount in each direction may be displayed by the displayer 50 and notified to the terminal 60.

Step S72

The processor 40 causes the displayer 50 to display or notifies the terminal 60 that there is a direction in which the mismatch amount is not less than the threshold for the fixed first to nth transfer objects $B_1$ to $B_n$. Also, the processor 40 causes the displayer 50 to display or notifies the terminal 60 of the direction in which the mismatch amount is not less than the threshold and the mismatch amount of the direction. Further, the mismatch amount may be displayed by the displayer 50 or notified to the terminal 60 for the direction in which the mismatch amount is less than the threshold.

In steps S71 and S72, the processor 40 may convert and display the mismatch amount detected in each direction into numerical values using units such as millimeters, centimeters, etc. Thereby, the user of the work support system 100 can easily ascertain the mismatch amount intuitively.

In steps S71 and S72, there may be no display of a notification for the directions in which the mismatch amount is less than the threshold. In other words, the processor 40 may not display or notify the results in step S71 and may display only the direction in which the mismatch amount is not less than the threshold and the mismatch amount of the direction in step S72.

Here, the case is described where the multiple transfer objects up to the first to nth transfer objects $B_1$ to $B_n$ are transferred. The work support system 100 according to the embodiment is applicable also when the transfer and fixation of one transfer object is performed. In other words, the method illustrated in the flowchart of FIG. 2 and FIG. 4 is applicable even in the case where only the first transfer object $B_1$ is transferred and fixed inside the structural object A.

The case is described in the example described above where the first to nth transfer objects $B_1$ to $B_n$ are imaged and the displacement of the first to nth transfer objects $B_1$ to $B_n$ is detected after the first to nth transfer objects $B_1$ to $B_n$ are fixed. The displacement of these transfer objects may be detected after the first to nth transfer objects $B_1$ to $B_n$ are arranged inside the structural object A prior to the fixation. The displacement can be corrected more easily by detecting the displacement prior to fixing each of the transfer objects.

The work support system 100 according to the embodiment may execute steps S5 to S7 of FIG. 2 each time one transfer object is transferred and arranged inside the structural object A. For example, the work support system 100 according to the embodiment executes steps S5 to S7 after the first transfer object $B_1$ is transferred and arranged prior to performing the fixation of the second transfer object $B_2$ and the connection with the first transfer object $B_1$. Thereby, the displacement of the first transfer object $B_1$ can be detected and corrected prior to the fixation and the connection of the second transfer object $B_2$. Therefore, the time necessary for the work can be shorter than in the case of correcting the displacement after all of the transfer objects are fixed and connected.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. Moreover, above-mentioned embodiments can be combined mutually and can be carried out.

What is claimed is:

1. A work support system, comprising:
   an imager configured to image a first transfer object after the first transfer object is transferred into a structural object and arranged inside the structural object;
   a storage part storing first three-dimensional data, the first three-dimensional data including three-dimensional data of the structural object and three-dimensional data of the first transfer object, the three-dimensional data of the first transfer object being overlaid at a first position inside the structural object of the three-dimensional data; and
   a processor detecting a displacement of the first transfer object of second three-dimensional data with respect to the first transfer object of the first three-dimensional data, the second three-dimensional data being obtained by imaging the first transfer object arranged inside the structural object,
   wherein the processor detects the displacement by calculating a mismatch amount of the first transfer object of the second three-dimensional data with respect to the first transfer object of the first three-dimensional data.

2. The system according to claim 1, further comprising a receiver,
   the mismatch amount including a first mismatch amount in a first direction, a second mismatch amount in a second direction, and a third mismatch amount in a third direction, the second direction being orthogonal to the first direction, the third direction being orthogonal to the first direction and the second direction, the processor detecting the displacement for each of the first direction, the second direction, and the third direction by calculating the first mismatch amount, the second mismatch amount, and the third mismatch amount, the processor transmitting the displacements to the receiver.

3. The system according to claim 2, wherein the processor compares each of the first mismatch amount, the second mismatch amount, and the third mismatch amount to a threshold stored in the storage part, and in the case where one or more of the first mismatch amount, the second mismatch amount, or the third mismatch amount is greater than the threshold, the processor transmits, to the receiver, the one or more of the first mismatch amount, the second mismatch amount, or the third mismatch amount and one or more of the first direction, the second direction, or the third direction corresponding to the one or more of the first mismatch amount, the second mismatch amount, or the third mismatch amount.

4. A work support system used in work, the work including a transfer of a first transfer object into a structural object, a transfer of a second transfer object into the structural object, and a connection between the first transfer object and the second transfer object, the system comprising:

an imager configured to image the first transfer object after the first transfer object is transferred into the structural object and arranged inside the structural object prior to the second transfer object being connected to the first transfer object;

a storage part storing first three-dimensional data, the first three-dimensional data including three-dimensional data of the structural object and three-dimensional data of the first transfer object, the three-dimensional data of the first transfer object being overlaid at a first position inside the structural object of the three-dimensional data; and a processor detecting a displacement of the first transfer object of second three-dimensional data with respect to the first transfer object of the first three-dimensional data, the second three-dimensional data being obtained by imaging the first transfer object arranged inside the structural object, wherein the processor detects the displacement by calculating a mismatch amount of the first transfer object of the second three-dimensional data with respect to the first transfer object of the first three-dimensional data.

5. The system according to claim 4, further comprising a receiver, the mismatch amount including a first mismatch amount in a first direction, a second mismatch amount in a second direction, and a third mismatch amount in a third direction, the second direction being orthogonal to the first direction, the third direction being orthogonal to the first direction and the second direction, the processor detecting the displacement for each of the first direction, the second direction, and the third direction by calculating the first mismatch amount, the second mismatch amount, and the third mismatch amount, the processor transmitting the displacements to the receiver.

6. The system according to claim 5, wherein the processor compares each of the first mismatch amount, the second mismatch amount, and the third mismatch amount to a threshold stored in the storage part, and in the case where one or more of the first mismatch amount, the second mismatch amount, or the third mismatch amount is greater than the threshold, the processor transmits, to the receiver, the one or more of the first mismatch amount, the second mismatch amount, or the third mismatch amount and one or more of the first direction, the second direction, or the third direction corresponding to the one or more of the first mismatch amount, the second mismatch amount, or the third mismatch amount.

7. A work method, comprising:

imaging a first transfer object after the first transfer object is transferred into a structural object and arranged inside the structural object;

acquiring first three-dimensional data, the first three-dimensional data including three-dimensional data of the structural object and three-dimensional data of the first transfer object, the three-dimensional data of the first transfer object being overlaid at a prescribed position inside the structural object of the three-dimensional data; and using the first three-dimensional data and second three-dimensional data to detect a displacement of the first transfer object of the second three-dimensional data with respect to the first transfer object of the first three-dimensional data, the second three-dimensional data being obtained in the imaging, wherein the processor detects the displacement by calculating a mismatch amount of the first transfer object of the second three-dimensional data with respect to the first transfer object of the first three-dimensional data.

8. The method according to claim 7, wherein the first transfer object is connected to the second transfer object transferred into the structural object, and the imaging of the first transfer object and the detecting of the displacement are performed after the first transfer object is arranged inside the structural object before the first transfer object is connected to the second transfer object.

9. The method according to claim 7, wherein a transfer path of the second transfer object into the structural object is generated using the second three-dimensional data.

* * * * *